United States Patent

[11] 3,565,225

[72] Inventor George W. Fay
208 Ricardo Road, Mill Valley, Calif. 94941
[21] Appl. No. 776,173
[22] Filed Nov. 15, 1968
[45] Patented Feb. 23, 1971

[54] FRUIT DECELERATING CHUTE
3 Claims, 5 Drawing Figs.
[52] U.S. Cl. .................................. 193/7; 193/25; 193/32
[51] Int. Cl. ........................................ B65g 11/10, B65g 11/20
[50] Field of Search ........................................ 193/7, 25, 27, 28, 32, 40

[56] References Cited
UNITED STATES PATENTS

| | | | |
|---|---|---|---|
| 670,222 | 3/1901 | Campbell | 193/32 |
| 846,751 | 3/1907 | Melvin | 193/32X |
| 1,133,436 | 3/1915 | Grambling | 193/27X |
| 1,334,643 | 3/1920 | Ansley | 193/7 |
| 3,448,847 | 6/1969 | Csimma | 193/32X |

FOREIGN PATENTS

| | | | |
|---|---|---|---|
| 1,226,916 | 8/1960 | France | 193/28 |
| 660,426 | 5/1938 | Germany | 193/32 |

*Primary Examiner*—Harvey C. Hornsby
*Assistant Examiner*—W.Scott Carson
*Attorney*—Lothrop and West

ABSTRACT: A moderately flexible tube several feet in length includes inner walls of resilient material. Rubber fingers are arranged radially within the tube in alternating, staggered tiers, each tier being approximately semicircular in plan. Fruit introduced into a funnel member at the upper end of the tube, the funnel also including fingers, descends through the tube in a cushioned, cascading, back-and-forth path, emerging from the bottom of the tube undamaged.

INVENTOR.
GEORGE W. FAY
BY
Lothrop & West
ATTORNEYS

INVENTOR.
GEORGE W. FAY
BY
Lothrop & West
ATTORNEYS

FRUIT DECELERATING CHUTE

The invention relates to devices for safely delivering fruit of a delicate, easily damaged nature from an elevated location, where the fruit is picked on the tree, to bins or boxes located several feet below.

Many types of nuts and even some kinds of fruit can be harvested by the shake and catch method wherein the tree is subjected to shaking or knocking, causing the crop to fall onto subjacent catching frames.

On many other crops, however, such as pears, peaches, apricots, apples and oranges, the above-described method would result in severe damage to the fruit. Consequently, it is necessary to continue to hand pick these more delicate types of fruit.

Hand picking has traditionally been effected by a skilled picker who mounts a ladder, picks all the fruit within reach, deposits the picked fruit in a bag or bucket carried by him, and descends the ladder from time to time to empty the bag or to relocate the ladder when necessary.

Not only is such a procedure time consuming and expensive but it is also tiring, even to a strong, skilled worker.

In order to overcome these disadvantages, devices have been developed to increase the extent of mechanization of hand picking. Inclusive of such devices have been wheel-supported frames movable along the tree rows, the frames having platforms at various heights. The pickers stand on the platforms and as the machine moves along the rows next to the trees, they pick all the fruit within their reach without having to climb up and down. The higher platforms may be 10 to 15 feet in elevation, an amount which would result in great damage to the fruit should it be allowed to descent to the containers below by free fall.

It is therefore an object of the invention to provide a chute into which fruit can conveniently be deposited as soon as it is picked, and which safely guides the fruit downwardly so that the fruit emerges in undamaged condition.

It is another object of the invention to provide a fruit decelerating chute which is relatively inexpensive, has no moving parts to get out of order and which can be beneficially used even by unskilled personnel.

It is another object of the invention to provide a fruit handling chute which is effective to service movable picking platforms and thereby obviate a large part of the drudgery involved in hand picking with a ladder.

It is a further object of the invention to provide a fruit decelerating chute which is reliable and versatile in operation in that it can readily be moved and repositioned where necessary.

It is another object of the invention to provide a generally improved fruit decelerating chute.

Other objects, together with the foregoing, are attained in the embodiment described in the following description and illustrated in the accompanying drawings in which.

Figure 1:
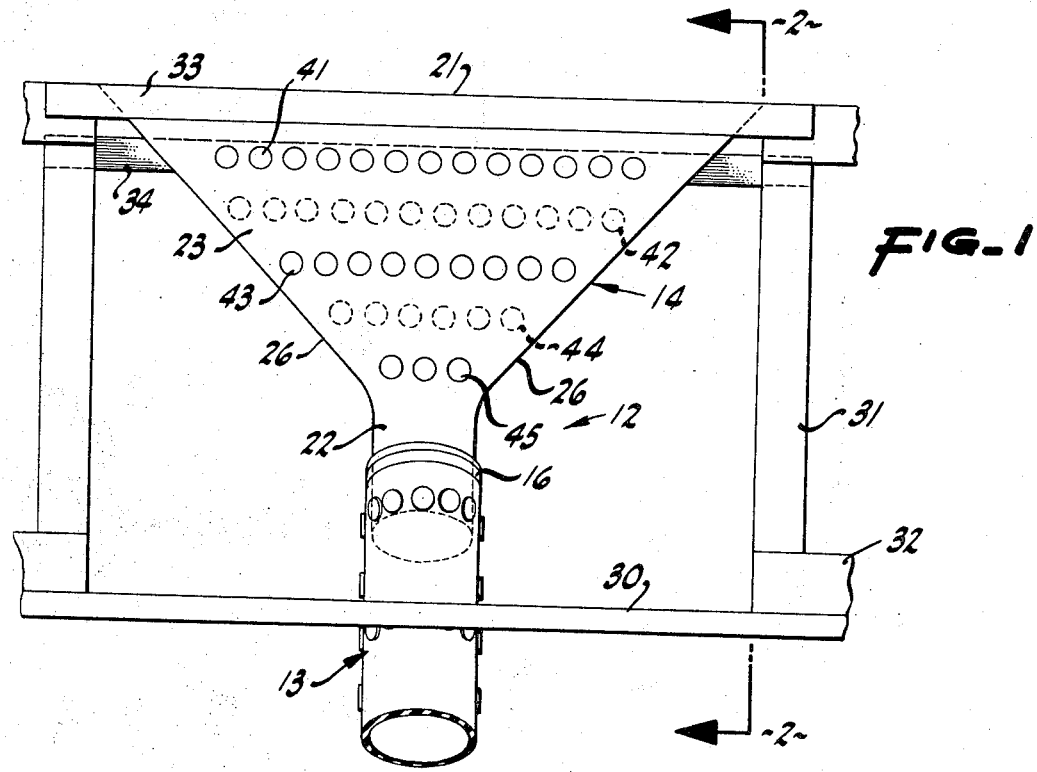
FIG. 1 is a fragmentary front elevational view of the upper end showing the device mounted on the platform carrying frame.

While the fruit decelerating chute of the invention can be embodied in many different forms, depending upon the circumstances, the herein shown and described embodiment has been exhaustively tested under field conditions and has performed in a very satisfactory manner.

The chute of the invention, generally designated by the reference numeral 12, includes a hose 13 surmounted at its upper end by a fruit collecting funnel 14, the funnel being detachably connected to the hose by suitable fittings 16.

The funnel 14 is generally of inverted triangular configuration in front elevation, tapering from a wide, upper fruit receiving mouth portion 21 downwardly to a spout portion 22 connected to the hose 13.

The funnel is defined by a front panel 23, a rear panel 24 and a pair of converging side panels 26. The upper end 27 of the rear panel 24 is somewhat below the elevation of the upper end 28 of the front panel 23, as appears most clearly in FIG. 2, thereby affording a wide, sloping, conveniently positioned mouth for the deposition of fruit picked by a picker standing on the platform 31 and reaching outwardly over the funnel mouth 21 into the tree being picked.

The elevated platform 30 is carried, along with suitable structural members 31, by a framework 32; and the funnel 14 and depending hose 13 are supported by horizontal structural members 33 and 34 to which the upper ends of the funnel panels 23 and 24, respectively, are secured by appropriate fasteners, not shown.

As each piece of fruit is dropped into the funnel mouth 21, the fruit successively encounters a plurality of horizontal rows 41, 42, 43, 44 and 45 of fingers 51. Each of the fingers 51 is T-shaped in median longitudinal section (see FIG. 3) and resembles in some respects a roofer's tack, having a disclike head 52 and an elongated, slightly tapered shank 53. The finger 51 terminates in a rounded tip 54.

Figure 2:
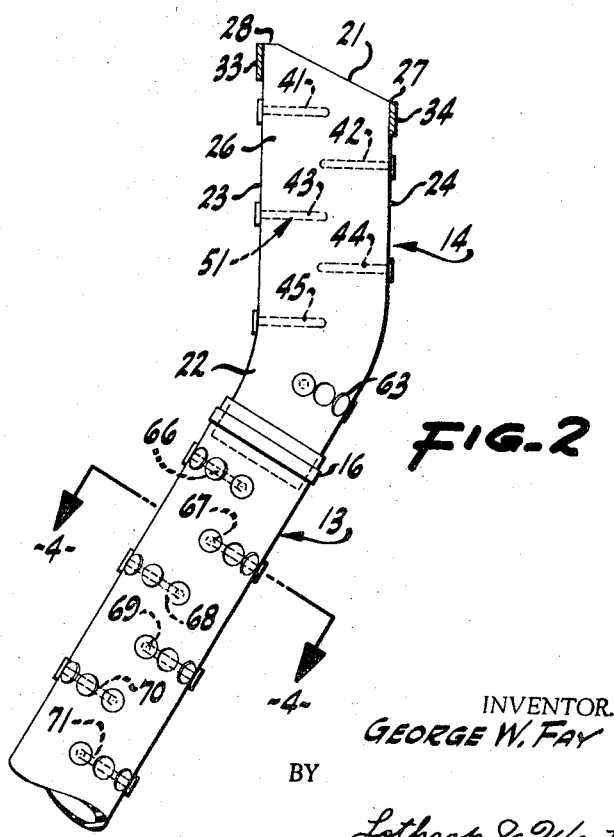
FIG. 2 is a fragmentary side elevational view of the upper end taken on the line 2—2 in FIG. 1.

The elongated shank 53 extends through a corresponding opening 56 in the funnel panel 23 and the finger tip projects toward the opposite panel 24 a distance somewhat in excess of midway (see FIG. 2).

Figure 3:
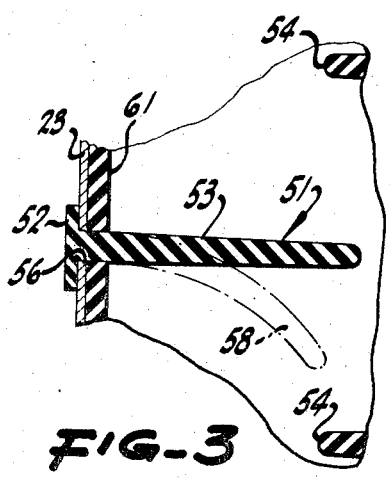
FIG. 3 is a fragmentary sectional view, to an enlarged scale, of the flexible finger mounting on the front panel of the fruit collecting funnel.

It has been found that molded rubber fingers of a moderate flexibility, each about 3 to 4 inches long, serve well to absorb the appropriate amount of energy from the falling fruit, the finger yielding, as indicated by the broken line 58 in FIG. 3, and slowing the descent of the fruit as well as deflecting the path of the fruit in a direction toward the row of fingers in the next lower tier. As appears most clearly in FIG. 2, the tiers are arranged in an alternating, or staggered fashion so as to guide the fruit in a front to rear movement as it cascades downwardly from one tier to the next.

In addition to the cushioning or buffering effect provided by the flexible fingers, it is also desirable to line the inside of the funnel with a resilient padding 61 (see FIG. 3), the padding being secured, as by an appropriate adhesive, to the sheet metal material forming the various panels of the funnel.

In the bottom spout, or transition portion 22 of the funnel, a special row 63 of fingers is provided on the back side where the curved portion of the elbow is located (see FIG. 2).

The fingers 51 in the row 63 deflect the fruit forwardly and downwardly onto the top tier 66 of a plurality of successive tiers 66, 67, 68, 69, 70, etc., down to the bottommost tier at the lower, discharge end of the hose 13.

Although the flexible fingers 51 within the hose 13 are substantially similar to the fingers 51 previously described in connection with the elongated tiers 41—45 within the funnel 14, the individual tiers of fingers within the hose are substantially semicircular in plan rather than rectangular, or shelflike, in plan as they are in the funnel tiers.

Figure 5:
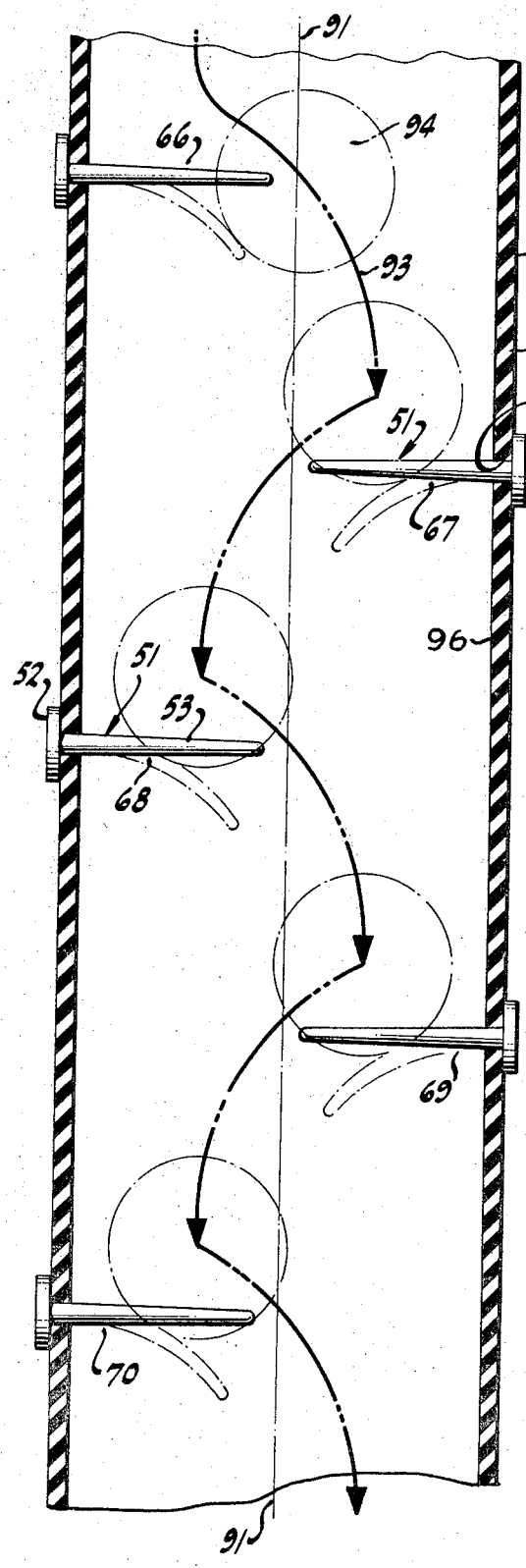
FIG. 5 is a fragmentary, median, longitudinal, sectional view to an enlarged scale of the hose, the plane of the section being indicated by the line 5—5 in FIG. 4.
Figure 4:
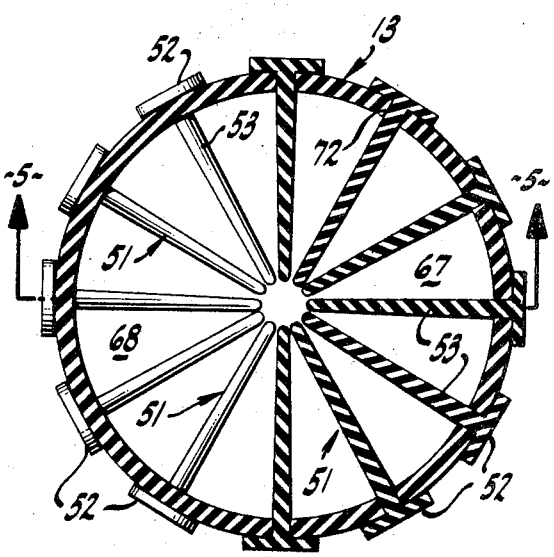
FIG. 4 is a transverse, sectional view of the hose to an enlarged scale, the plane of the section being indicated by the line 4—4 in FIG. 2.

As is shown most clearly in FIGS. 4 and 5, the walls 71 of the resilient, moderately flexible hose 13 are pierced at intervals by openings 72 through which are inserted the elongated shanks 53 of the fingers 51, the disclike heads 52 abutting against the outside surface of the hose 13. In the usual case a tight frictional fit suffices to hold the fingers securely in place.

In the embodiment shown herein, each of the semicircular hose tiers 66—70, etc. comprises seven individual fingers 51 arranged radially (see FIG. 4) and terminating at the finger tips 54 located substantially on the central axis 91 of the hose 13.

Furthermore, each hose tier, as before, is arranged in a staggered or alternating fashion, as shown in FIGS. 2, 4 and 5 so that the tier 68, for example, is located 180° out of phase with the superposed tier 67 and the subjacent tier 69. The diametrical fingers overlap when viewed in plan.

Here again, the cascaded, alternate arrangement of tiers is such as to direct the path 93 of the fruit 94 downwardly and in an oscillating, to-and-fro pattern (see FIG. 5), the resilient fingers flexing as shown both for the purpose of retarding the rate of descent and of cushioning the impact as the fruit impinges against the fingers.

As previously mentioned, the hose 13 is formed of a resilient material so that in the event any fruit should strike the inner wall surface 96 of the hose 13, no damage of consequence would result. It has been found, however, that the resilient, alternately phased hose tiers are extremely effective in guiding the fruit in the path shown in FIG. 5 where each fruit oscillates to-and-fro but a short distance from the hose axis 91 at which location finger resiliency, and thus cushioning, is at a maximum.

The result is that even from a height of 10 to 15 feet, delicate fruit is safely and carefully transported downwardly so that upon discharge from the lower end of the conduit each piece of fruit slowly rolls out into the underlying container in an undamaged condition.

I claim:

1. A fruit decelerating chute comprising:
   a. a tubular conduit of resilient hose material, said conduit having interior wall surfaces of resilient material and extending from an upper intake portion to a lower discharge portion;
   b. a plurality of flexible fingers mounted on said conduit and extending perpendicularly from said interior wall surfaces into the interior of said conduit into interfering relation with fruit moving therethrough, said flexible fingers being arranged in a plurality of tiers, each of said tiers being substantially semicircular in plan, said tiers being formed in alternating arrangement effective to direct fruit descending through said chute in an alternating side-to-side pathway; and
   c. a fruit channeling funnel mounted on said upper portion of said conduit, said funnel including a plurality of flexible fingers mounted on the inner walls of said funnel and extending interiorly into the path of picked fruit deposited in the mouth of said funnel.

2. A fruit decelerating chute as in claim 10 wherein each of said fingers is substantially T-shaped in longitudinal section and wherein the elongated shank of each of said fingers extends through a corresponding opening in said funnel and in said hose walls and wherein the base portion of each of said fingers abuts the outer surface of said funnel and said hose walls.

3. A fruit decelerating chute comprising:
   a. a tubular conduit of resilient hose material extending from an upper intake portion to a lower discharge portion;
   b. a plurality of radial flexible fingers mounted on the walls of said conduit and extending substantially perpendicular to the longitudinal axis thereof, said fingers being arranged in a plurality of tiers, each tier being substantially semicircular in plan and arranged in an alternating pattern effective to guide fruit descending through said chute in an alternating side-to-side pathway; and
   c. a fruit channeling funnel mounted on said upper portion of said conduit.